C. R. NORDIN.
AUTOMOBILE LOCK.
APPLICATION FILED SEPT. 29, 1919.
1,376,221.
Patented Apr. 26, 1921.
2 SHEETS—SHEET 1.
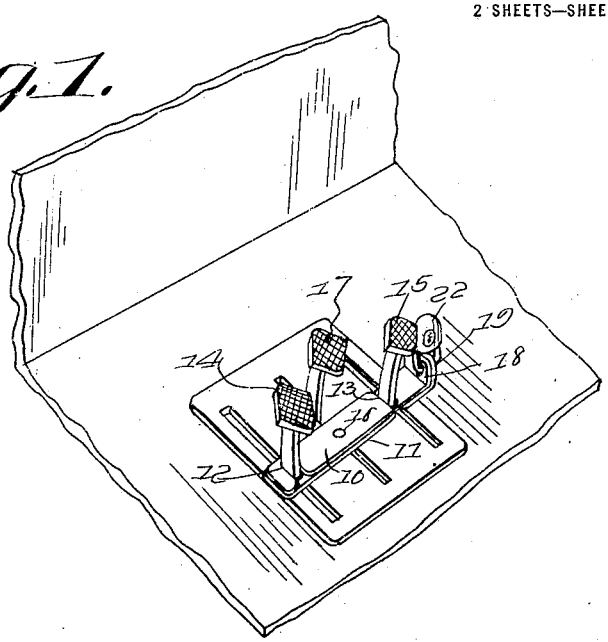
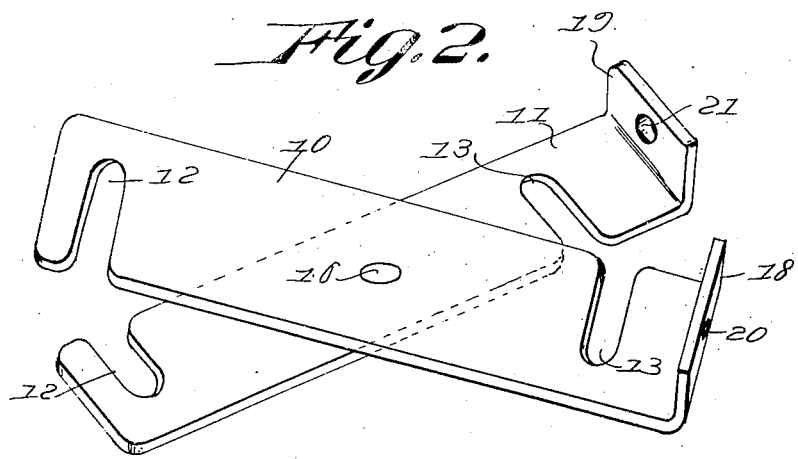
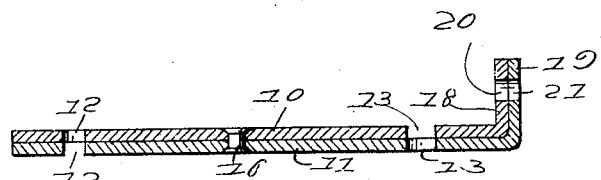
Inventor
Charles R. Nordin

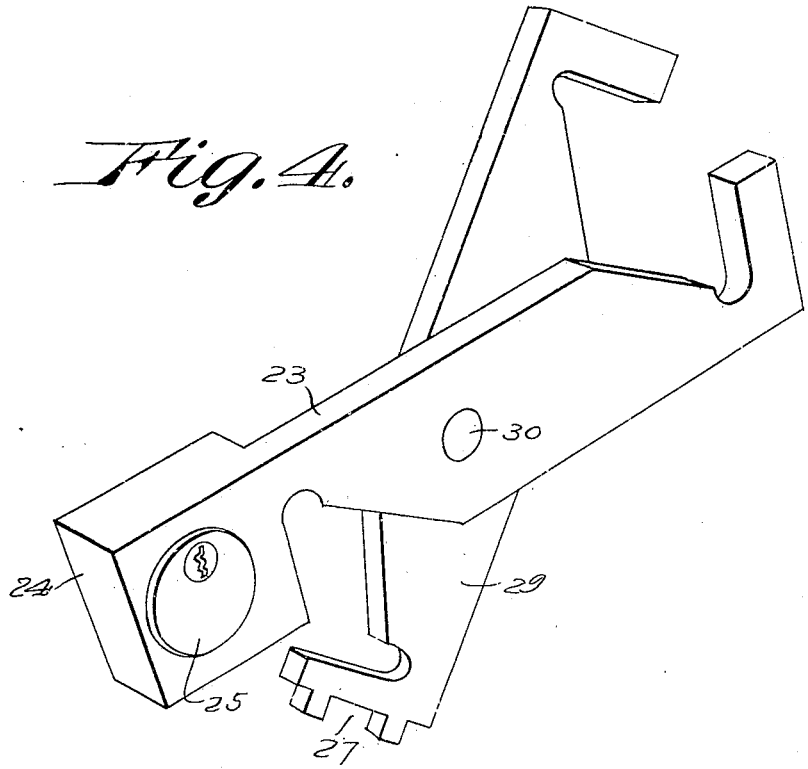
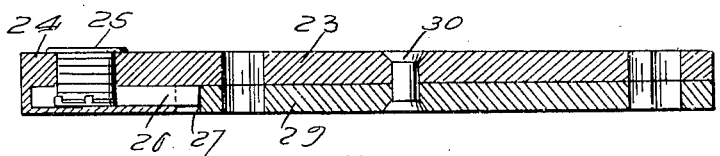

UNITED STATES PATENT OFFICE.

CHARLES R. NORDIN, OF OMAHA, NEBRASKA.

AUTOMOBILE-LOCK.

1,376,221.   Specification of Letters Patent.   Patented Apr. 26, 1921.

Application filed September 29, 1919. Serial No. 327,078.

*To all whom it may concern:*

Be it known that CHARLES R. NORDIN, a citizen of the United States of America, residing at Omaha, in the county of Douglas and State of Nebraska, has invented new and useful Improvements in Automobile-Locks, of which the following is a specification.

The object of the invention is to provide a simple, inexpensive and efficient means whereby an automobile, particularly of the Ford type, may be locked against surreptitious removal either by operation of the car itself or by towing or pushing the same, the effect of the lock being such as to prevent the starting of the engine or the release of the brakes, and to this end the same consists of a construction and combination of parts of which a preferred embodiment is illustrated in the accompanying drawing, wherein:

Figure 1 is a perspective view of the lock applied in the operative position to the foot pedals of a car of the indicated type.

Fig. 2 is a perspective view of the locking device detached.

Fig. 3 is a longitudinal sectional view of the same.

Fig. 4 is a perspective view of a slightly modified construction of locking bar.

Fig. 5 is a longitudinal section of the same.

The device consists essentially of pivotally connected relatively movable members 10 and 11 consisting of plates or bars provided at corresponding opposite points with pairs of complemental notches 12—12 and 13—13 adapted when the members are alined or arranged in co-extensive relation as indicated in Fig. 1 to form seats for engagement respectively with the clutch pedal 14 and the brake pedal 15, the intermediate body portion of the composite bar represented by the said members 10 and 11 which as above noted are pivotally connected as at 16, lying in front of, and hence in the path of the reverse pedal 17.

In applying the lock to the automobile the reverse lever should be pressed into reverse position as indicated in Fig. 1 and the clutch and brake pedals allowed to stand respectively in high and non-braking positions so that the engagement of the device as indicated will hold the reverse pedal in applied position and said clutch and brake pedals respectively in high and inactive positions to the end that the movement of the reverse pedal into neutral position is prevented by contact with the intermediate portion of the composite bar, and similarly the movement of either the clutch pedal or the brake pedal to low gear or active position is prevented by reason of the fact that the said reverse pedal is in the path of movement of said bar, and obviously, under these conditions the starting of the engine and the movement of the car is prevented. Since the application of the lock leaves both the reverse and forward pedals in active positions, it is not possible to rotate the transmission mechanism and hence movement of the car by pushing the same or by attempting to tow it is also prevented.

Any suitable means for holding the members of the composite locking bars in their alined positions with the complemental notches thereof in engagement with the clutch and brake pedals may be accomplished in a variety of ways, the method indicated in the form of the device shown in Figs. 1, 2 and 3 involving the provision of the members 10 and 11 of said bar with upturned ears 18 and 19 having registering openings 20 and 21 for engagement by the hasp of a padlock 22.

On the other hand in the construction illustrated in Figs. 4 and 5 the member 23 of the composite bar carries a lock casing 24 in which may be secured any preferred form of lock of which the face plate is indicated at 25 and is fitted with a bolt 26 for engagement with a seat 27 in the adjacent end of the member 29, said members 23 and 29 being pivotally connected as at 30 and otherwise being substantially of the same construction as those described in relation to the form of the invention illustrated in Figs. 1, 2 and 3.

What is claimed is:

A locking device for automobiles of the type wherein a reverse pedal is disposed for movement between the planes of the clutch and brake pedals, the same comprising a composite bar constituting relatively movable members consisting of plates pivotally connected in superposed relation and at substantially intermediate points in their lengths, each plate being formed with a notch adjacent each end, the two notches in each plate being formed in opposite edges of said plate whereby those in opposite plates constitute complemental means forming seats for engagement respectively with the said clutch and brake pedals, and means for securing said plates in co-extensive relation to dispose the intermediate portions in the path of movement of the reverse pedal.

In testimony whereof I affix my signature.

CHARLES R. NORDIN.